(12) United States Patent
Kisliakov

(10) Patent No.: US 12,190,129 B2
(45) Date of Patent: Jan. 7, 2025

(54) CONTROL OVER APPLICATION PLUGINS

(71) Applicant: Citrix Systems, Inc., Fort Lauderdale, FL (US)

(72) Inventor: Andrew Kisliakov, Burt St. Edmunds (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/646,892

(22) Filed: Jan. 4, 2022

(65) Prior Publication Data
US 2023/0214235 A1   Jul. 6, 2023

(51) Int. Cl.
*G06F 9/445* (2018.01)
*G06F 9/54* (2006.01)

(52) U.S. Cl.
CPC .......... *G06F 9/44526* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 9,043,863 | B1 * | 5/2015 | Enderwick | G06F 21/604 |
| | | | | 726/17 |
| 2003/0135750 | A1 * | 7/2003 | Circenis | G06F 21/6218 |
| | | | | 726/21 |
| 2009/0222925 | A1 * | 9/2009 | Hilaiel | G06F 21/53 |
| | | | | 726/25 |
| 2012/0117644 | A1 * | 5/2012 | Soeder | G06F 21/554 |
| | | | | 726/22 |
| 2013/0192482 | A1 * | 8/2013 | Bloom | H05K 3/1216 |
| | | | | 101/127 |
| 2014/0181792 | A1 * | 6/2014 | Fanning | G06F 8/60 |
| | | | | 717/124 |
| 2015/0052514 | A1 * | 2/2015 | Zetterquist | G06F 8/41 |
| | | | | 717/177 |
| 2019/0303123 | A1 * | 10/2019 | Levac | G06F 8/71 |
| 2020/0167491 | A1 * | 5/2020 | Grabois | G06F 21/568 |
| 2020/0374280 | A1 * | 11/2020 | Zeng | H04L 67/141 |
| 2022/0114007 | A1 * | 4/2022 | Korala | G06F 9/45533 |

* cited by examiner

*Primary Examiner* — Umut Onat

(57) ABSTRACT

A system and method for implementing a plugin control mechanism. A disclosed method includes: launching an application; injecting additional functionality into the application; and utilizing the additional functionality to: detect a file processing call; evaluate the file processing call against to a set of rules to determine whether the file processing call involves execution of an extension file; and call an operating system (OS) application control function in response to determining the file processing call involves execution of the extension file, wherein the OS application control function is configured to conditionally prevent execution of the extension file.

20 Claims, 4 Drawing Sheets

CONTROL OVER APPLICATION PLUGINS

BACKGROUND OF THE DISCLOSURE

Various software platforms including MICROSOFT WINDOWS® provide a plugin mechanism that allows the capabilities of applications to be extended with the installation and execution of software extensions (i.e., plugins). For example, Microsoft® Visual Studio Code® is a source code editor for developing software that allows different extensions to be loaded to, e.g., support different programming languages. The web browser GOOGLE CHROME® is another example, in which plugins are available to manage passwords, view PDF files, create documents, etc. Typically, plugins are implemented by parties different from the authors of the associated application.

BRIEF DESCRIPTION OF THE DISCLOSURE

Aspects of this disclosure include a system and method for controlling the use of application extensions.

A first aspect of the disclosure provides a method for controlling execution of application extensions. The method includes: launching an application and injecting additional functionality into the application. The additional functionality is used to: detect a file processing call; evaluate the file processing call against to a set of rules to determine whether the file processing call involves execution of an extension file; and call an operating system (OS) application control function in response to determining the file processing call involves execution of the extension file, wherein the OS application control function is configured to conditionally prevent execution of the extension file.

A second aspect of the disclosure provides a system that includes a memory for storing program instructions and a processor coupled to the memory and configured to perform processes. Such processes include launching an application and injecting additional functionality into the application. The additional functionality is utilized to: detect a file processing call; evaluate the file processing call against to a set of rules to determine whether the file processing call involves execution of an extension file; and call an operating system (OS) application control function in response to determining the file processing call involves execution of the extension file, wherein the OS application control function is configured to conditionally prevent execution of the extension file.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
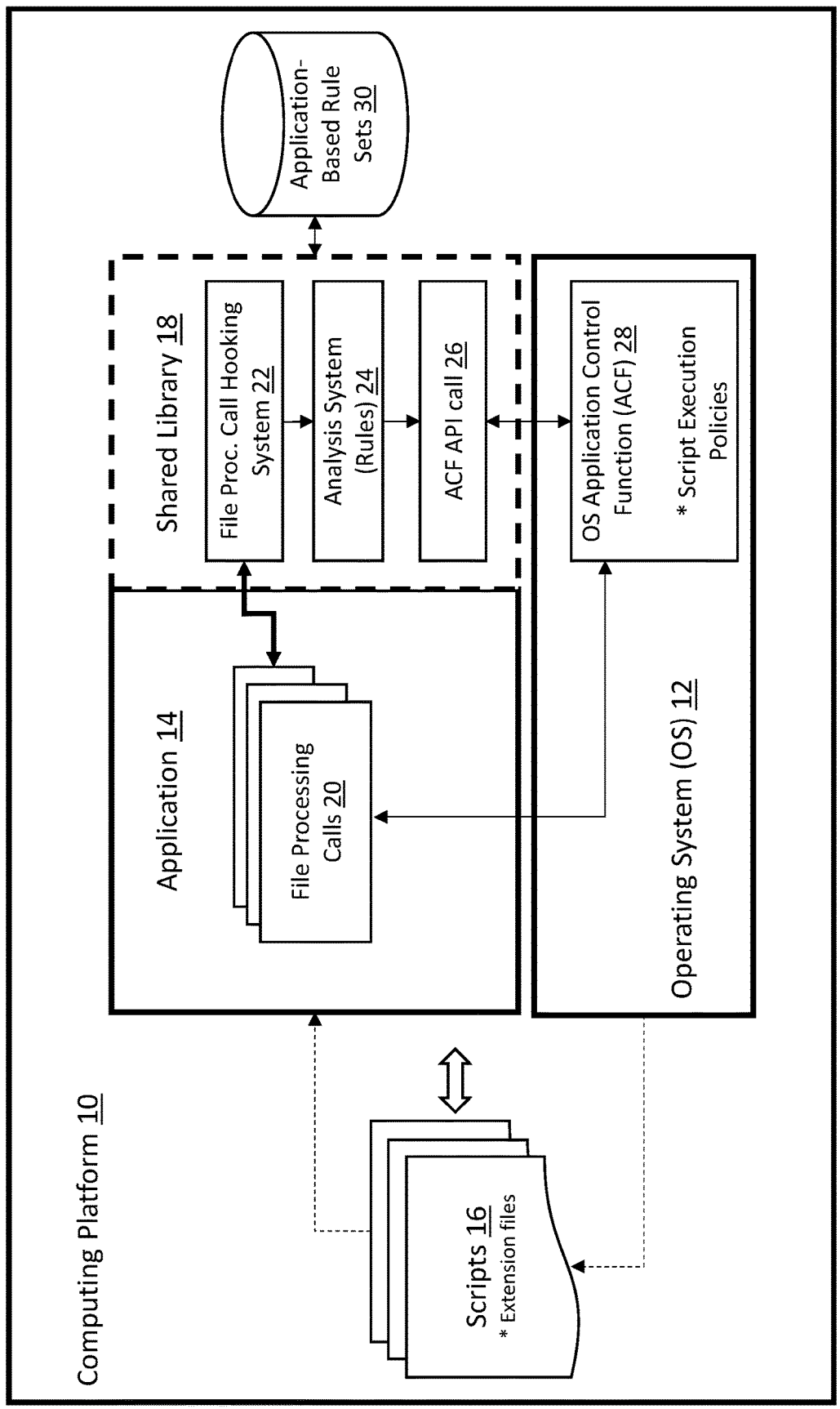
FIG. 1 depicts an illustrative computer platform that depicts a plugin control solution, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for controlling aspects of a computing platform. In particular, enhanced control over the use of software extensions (also referred to herein as extensions, extension files or plugins), within the platform is provided. While plugins create flexibility for implementing applications, enterprises may wish to control the use of plugins within the enterprise, i.e., providing limits on which plugins can be installed and executed by users. For instance, the enterprise may want to first vet the efficacy and safety of a given plugin before allowing users to run the plugin. In some cases, the applications themselves include an enforcement mechanism, e.g., Google Chrome provides a Group Policy mechanism for allowing or disallowing certain extensions. In other cases, no such mechanism exists.

Because of the way extensions are implemented, they create various security risks for users of the associated, i.e., "pluggable," application. For instance, a malicious actor can cause plugins to establish a foothold on a victim's system, e.g., by tricking users into downloading a malicious extension, or by exploiting vulnerabilities in otherwise legitimate extensions. Thus, in order to overcome such security risks, solutions are provided to control which extensions can be loaded and executed by users running pluggable applications within the computing platform.

As noted, many applications that use plugins do not include a mechanism for controlling their execution by end users. Further, while operating systems such as Windows® include an application control function for controlling the execution of specified processes, such tools generally cannot be used to control plugin execution. For example, AppLocker® is a technology built into Windows® that provides policy-based application control. AppLocker® allows for control over native executable file formats (e.g., EXE and DLL files), as well as limited control over script files. Often, plugins are implemented using a scripting language such as JavaScript™. However, the script enforcement of AppLocker® applies only when scripts are executed using an engine which cooperates with AppLocker® itself. For example, JavaScript™ scripts can be controlled when invoked using the Microsoft® Scripting Engine, but not when loaded in the context of a third-party application such as Visual Studio Code® or Google Chrome®

To overcome this technical problem, a computer platform is described herein that causes a shared library, such as a dynamic link library (DLL), to be deployed with (i.e., injected into) pluggable applications when such an application is launched. The shared library includes additional functionality that detects whether an extension file is being loaded for execution and if so, interacts with an OS application control function (e.g., AppLocker®) to conditionally allow or prevent loading and execution of the extension file.

Referring to FIG. 1, an illustrative computing platform 10 is shown that includes an operating system (OS) 12, e.g., Windows®, having an OS application control function (ACF) 28, e.g., AppLocker®. Also shown is a pluggable application 14 configured to run within the OS 12 environment that may call and utilizes any number of scripts, e.g., JavaScript™. In some cases, one of more of the scripts 16 may include code associated with loading and executing an extension file. In many operating systems, such as Windows®, execution of a script 16 is instantiated from the application 14 with a file processing call 20 to the OS 12 (e.g., a CreateFile API or NtCreateFile API call in Windows®). In response to a file processing call 20, OS 12 determines how to process the script, e.g., open for editing, for execution, etc.

While ACF 28 cannot control, i.e., prevent or allow execution of the plugin itself, it can, e.g., prevent or allow execution of scripts based on criteria such as a file path in which the script is stored, a publisher (e.g., a combination of a certificate and additional details embedded in a file such as a company name, product name, etc.), a file hash, etc. ACF 28 is limited however in checking such criteria if the application 14 does not itself perform the appropriate application programming interface (API) call to the ACF 28. Accordingly, in one illustrative embodiment, a shared library 18 is injected into the application 14 when the application 14 is launched to provide additional functionality, i.e., to implement a plugin control mechanism. In some aspects, the additional functionality evaluates all file processing calls 12 run by the application 14 against a set of rules to determine if the file processing call 12 likely involves execution of an extension file. In the case where the file processing call 20 involves an extension file execution, an application programming interface (API) call is made to ACF 28, e.g., with the location of the script file 16, to determine whether execution of the extension file is permitted.

In the example shown in FIG. 1, the additional functionality provided by the shared library 18 includes a file processing call hooking system 22 that detects when a file processing call 20 is being made and hooks the call 20 (i.e., reroutes execution) to analysis system 24. Analysis system 24 includes a set of rules that determines whether the file processing call 20 involves (or likely involves) execution of an extension file. If the call 20 does not involve an extension file, control is returned to the application 14 for execution of the file processing call. If however the call appears to involve an extension file, then an ACF API call 26 is made to the ACF 28, e.g., with the location of the extension file and/or other criteria, from which the ACF 28 either allows or denies execution of the extension file.

In various embodiments, each different pluggable application that runs in computing platform 10 may require its own unique set of rules for determining whether a file processing call 20 involves the execution of an extension file. Accordingly, in some approaches, the computing platform 10 may alternatively include separate application-based rule sets 30. In this case, rather than hardcoding rules into different shared libraries 18 for different pluggable applications, the rules for different applications can be cohesively maintained in the application-based rule set 30 and read in as needed by a shared library 28.

Regardless, the set of rules used for a given application 14 includes logic to perform any number or type of checks to ascertain whether the call 20 involves or likely involves execution of an extension file. For example, the set of rules may include: a check to determine a likelihood that the file processing call 20 is invoked to execute code; a check to determine whether a file specified by the file processing call includes a JavaScript™ (js) extension; a check to determine whether the file processing call is being invoked in a read-only access mode; a check to determine whether a file path specified by the file processing call matches a predefined file path; a check to determine whether a name and a command line of a currently executing process is intended to execute code contained within a specified file (e.g., *\.vscode\extensions\*); a check to determine whether an execution stack of a current thread includes a function related to an invocation of executable code; etc.

Figure 2:
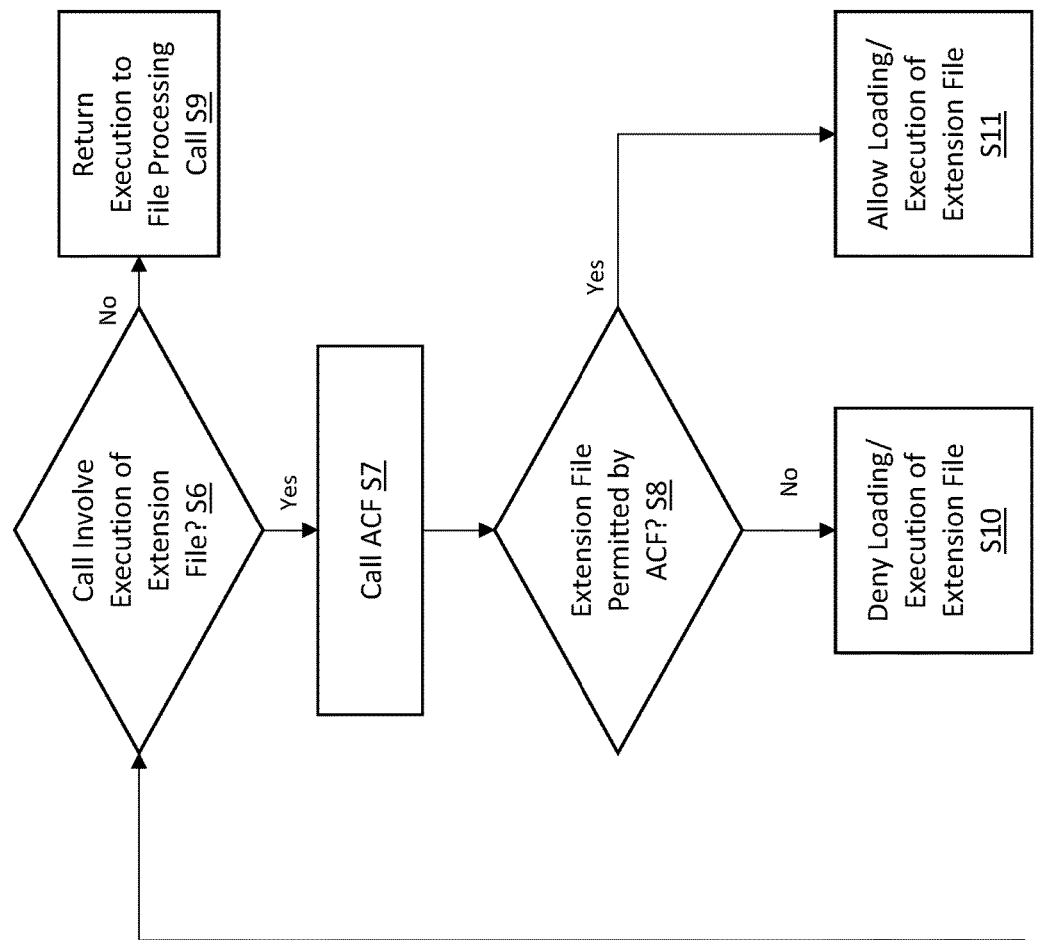
FIG. 2 depicts a flow diagram of a plugin control process, in accordance with an illustrative embodiment.
Figure 2:
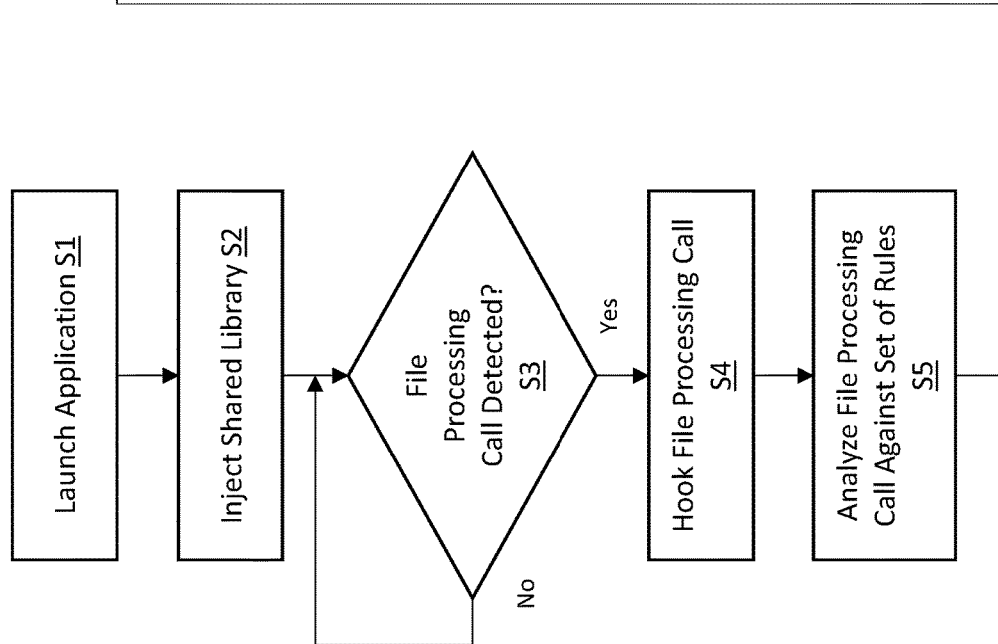

FIG. 2 depicts an illustrative process for implementing a plugin control mechanism, with reference to FIG. 1. At S1, a pluggable application 14 is launched and at S2 a shared library 18 (e.g., a DLL) is injected into the application 14 to provide additional functionality. The ability to inject shared libraries, such as DLLs, into an application is a well understood technique provided by any number of operating systems. For example, MS Windows provides an Appinit_DDLs call that automatically loads DLL names listed at a specified memory. At S3, the additional functionality detects when a file processing call is made during execution of the application 14, and when detected, hooks the file processing call at S4. Hooking is common technique implemented during runtime that for instance changes the very first few code instructions of a target function (e.g., a CreateFile API call or an NtCreateFile API call) that redirects execution to a different function. For example, on systems using a shared library concept, an import descriptor table can be modified in memory to redirect code execution.

In this case, the hook redirects execution to an analysis system 24 in the shared library 18 that analyzes the file processing call against a set of rules at S5. If the call does not involve execution of an extension file at S6, execution is returned to the original file processing call at S9 and the file associated with the file processing call is processed in a normal manner. If the call involves execution of an extension file at S6, the analysis system 24 calls the OS application control function (ACF) 28 (e.g., AppLocker®) at S7 to determine whether to permit loading/execution of the extension file at S8. If permitted by ACF 28 at S8, the extension file is allowed to load and execute at S11. If not permitted by ACF 28 at S8, the extension file is denied being able to load and execute at S10.

Accordingly, for those applications that do not provide any centrally managed extension control mechanism (e.g., Visual Studio Code®), this approach provides an effective mechanism for providing such control. For those applications that do provide a centrally managed extension control mechanism (e.g., Google Chrome® Group Policy Objects), this approach provides an effective defense in depth mechanism, limiting the possibility of circumvention of the existing mechanism, or of tampering, e.g., if script files are signed. As such, this solution can be implemented for a broad range of extensible (i.e., pluggable) applications, and be effective with many applications that support extensibility via scripting.

Further, in platforms using Windows® or similar operating systems, this solution provides direct integration with AppLocker®, avoids the need for a separate mechanism for policy management and deployment, and allows use of the existing AppLocker® rule types (publisher rules, path rules, hash rules, etc.). Additionally, this solution provides the ability to monitor application extension usage, e.g., by having AppLocker® record events to a Windows® event log. These logs can be used to monitor application extension script usage, even if the policy does not block the scripts.

Moreover, the solution can be implemented with a lightweight design, in which the necessary code is encapsulated in a single DLL that interacts with only a handful of Windows APIs. Accordingly, application transparency is maintained as applications and their extensions do not need to be modified. Furthermore, the control mechanisms described herein can be integrated with any third-party scripting engine and be integrated with scripting languages not supported by the platform scripting engine.

Figure 3:
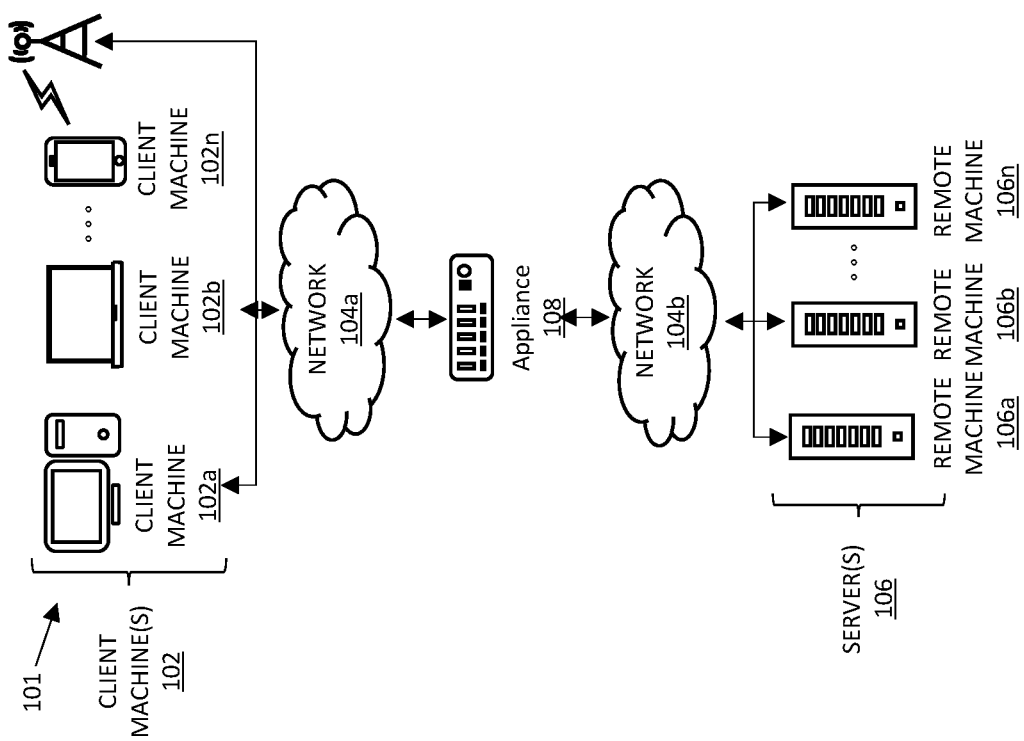
FIG. 3 depicts a network infrastructure, in accordance with an illustrative embodiment.

It is understood that computing platform 10 can be implemented in any manner, e.g., as a stand-alone system, a distributed system, within a network environment, etc. Referring to FIG. 3, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java® applet; software related to voice over internet protocol (VOIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 4:
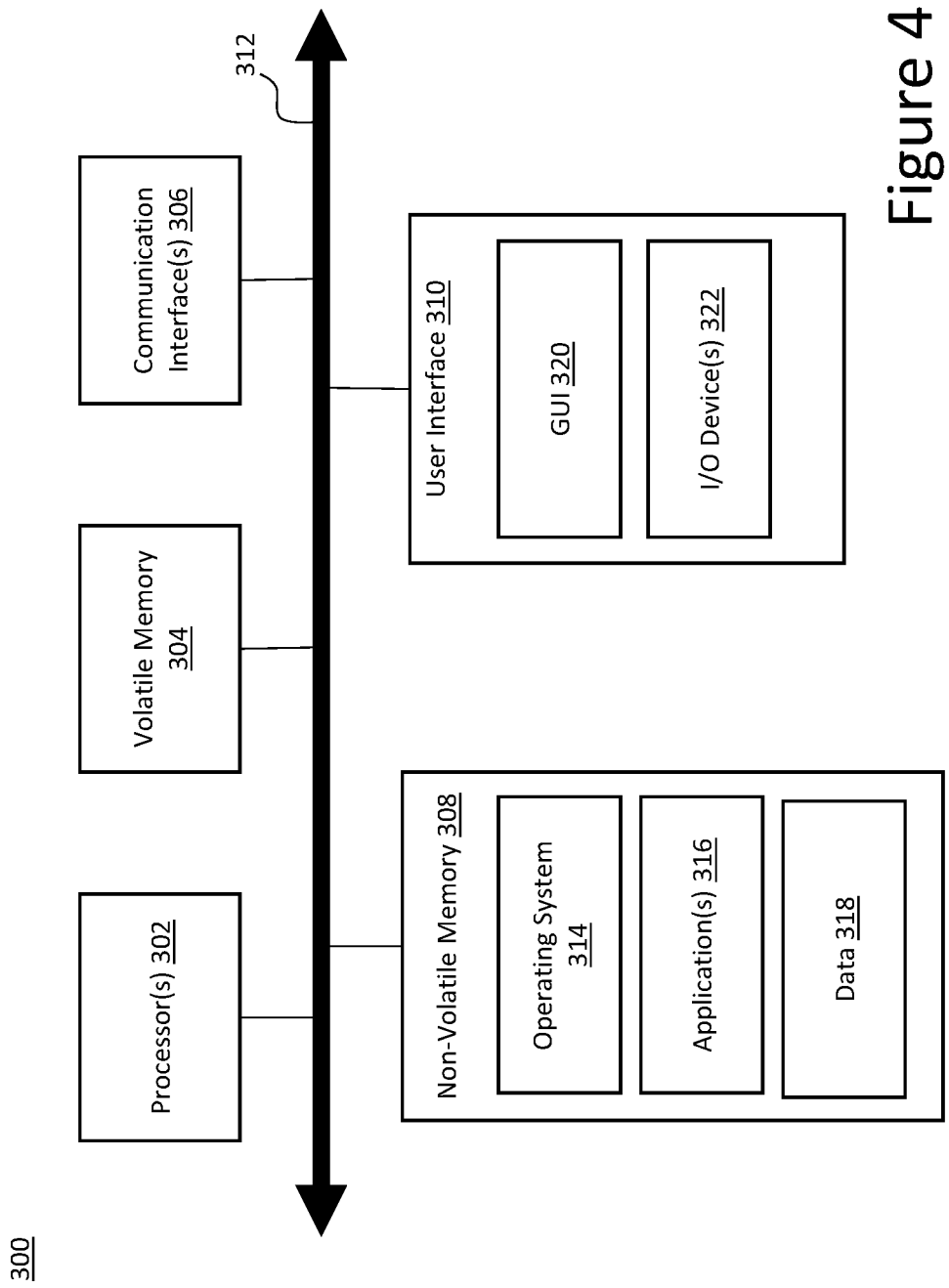
FIG. 4 depicts a computing system, in accordance with an illustrative embodiment.

Elements of the described solution may be embodied in a computing system, such as that shown in FIG. 4 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 4 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The invention claimed is:

1. A method for controlling execution of application extensions, comprising:
   launching an application;
   injecting additional functionality into the application; and
   utilizing the additional functionality to detect a file processing call with a hooking process to reroute normal execution of code in the application to an analysis process, the analysis process including:
      determining, prior to execution of the file processing call, whether the file processing call involves execution of an extension file by evaluating the file processing call against a set of rules, the set of rules including a check to determine whether a name and a command line of a currently executing process is intended to execute code; and
      calling an operating system (OS) application control function based on the file processing call being determined to involve execution of the extension file and the name and the command line of the currently executing process being intended to execute code, the OS application control function including a policy-based application control function configured to conditionally prevent execution of the extension file.

2. The method of claim 1, wherein the additional functionality is implemented in a shared library.

3. The method of claim 1, wherein the set of rules includes: a check to determine a likelihood that the file processing call is invoked to execute code contained within the extension file.

4. The method of claim 1, wherein the set of rules includes: a check to determine whether the file processing call is being invoked in a read-only access mode.

5. The method of claim 1, wherein the set of rules includes: a check to determine whether a file path specified by the file processing call matches a predefined file path.

6. The method of claim 1, wherein the set of rules includes: a check to determine whether a name and a command line of a currently executing process is intended to execute code.

7. The method of claim 1, wherein the set of rules includes: a check to determine whether an execution stack of a current thread includes a function related to an invocation of executable code.

8. The method of claim 1, wherein evaluating the file processing call further includes:
 loading an extension manifest;
 attempting to identify an extension entry point script; and
 determining if the extension file is the same as the extension entry point script.

9. The method of claim 1, wherein the file processing call comprises at least one of a CreateFile API or NtCreateFile API call.

10. The method of claim 1, wherein the OS application control function is only called if the file processing call involves execution of an extension file.

11. The method of claim 1, wherein the set of rules includes: a check to determine whether a file specified by the file processing call includes a scripting language extension.

12. A system, comprising:
 a memory storing program instructions; and
 a processor coupled to the memory and in response to executing the program instructions is configured to perform processes including:
  launching an application;
  injecting additional functionality into the application; and
  utilizing the additional functionality to detect a file processing call with a hooking process to reroute normal execution of code in the application to an analysis process, wherein the analysis process includes:
   determining, prior to execution of the file processing call, whether the file processing call involves execution of an extension file by evaluating the file processing call against a set of rules, the set of rules includes a check to determine whether a name and a command line of a currently executing process is intended to execute code; and
  calling an operating system (OS) application control function based on the file processing call being determined to involve execution of the extension file and the name and the command line of the currently executing process being intended to execute code, the OS application control function including a policy-based application control function that is configured to conditionally prevent execution of the extension file.

13. The system of claim 12, wherein the additional functionality is implemented in a shared library.

14. The system of claim 12, wherein the set of rules includes: a check to determine a likelihood that the file processing call is invoked to execute code contained within the extension file.

15. The system of claim 12, wherein the set of rules includes: a check to determine whether a file specified by the file processing call includes a scripting language extension.

16. The system of claim 12, wherein the set of rules includes: a check to determine whether a file path specified by the file processing call matches a predefined file path.

17. The system of claim 12, wherein the set of rules includes: a check to determine whether a name and a command line of a currently executing process is intended to execute code.

18. The system of claim 12, wherein the set of rules includes: a check to determine whether an execution stack of a current thread includes a function related to an invocation of executable code.

19. The system of claim 12, wherein the OS application control function is only called if the file processing call involves execution of an extension file.

20. The system of claim 12, wherein the set of rules includes: a check to determine whether the file processing call is being invoked in a read-only access mode.

* * * * *